Figure 4:
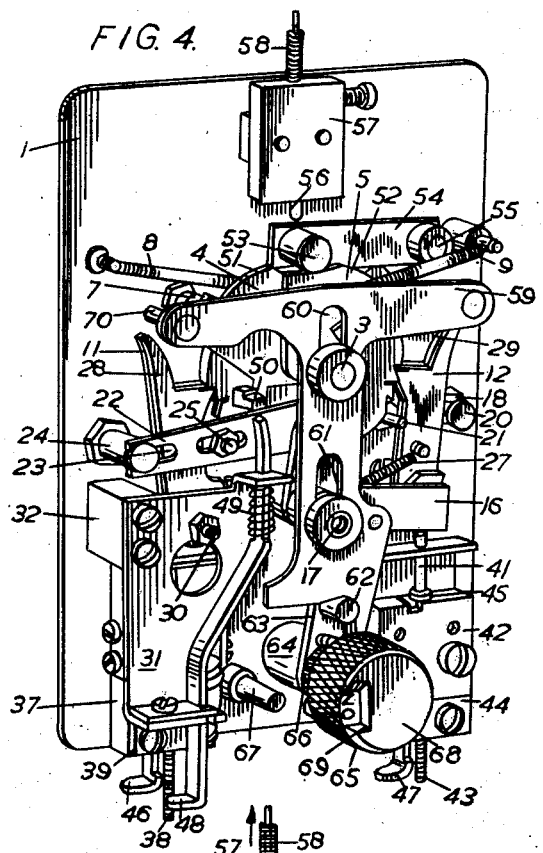

July 1, 1952  N. G. HOLDEN  2,601,787
RECORD CONTROLLED STATISTICAL MACHINE
Filed Oct. 4, 1950  2 SHEETS—SHEET 1
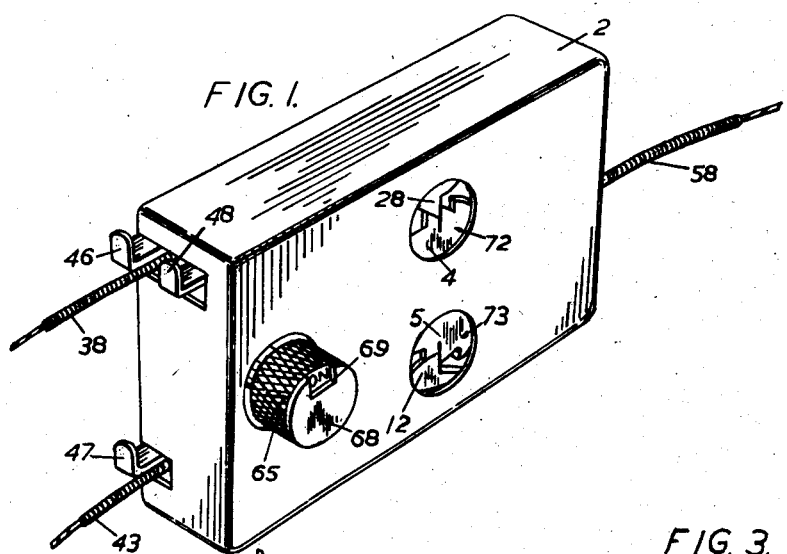
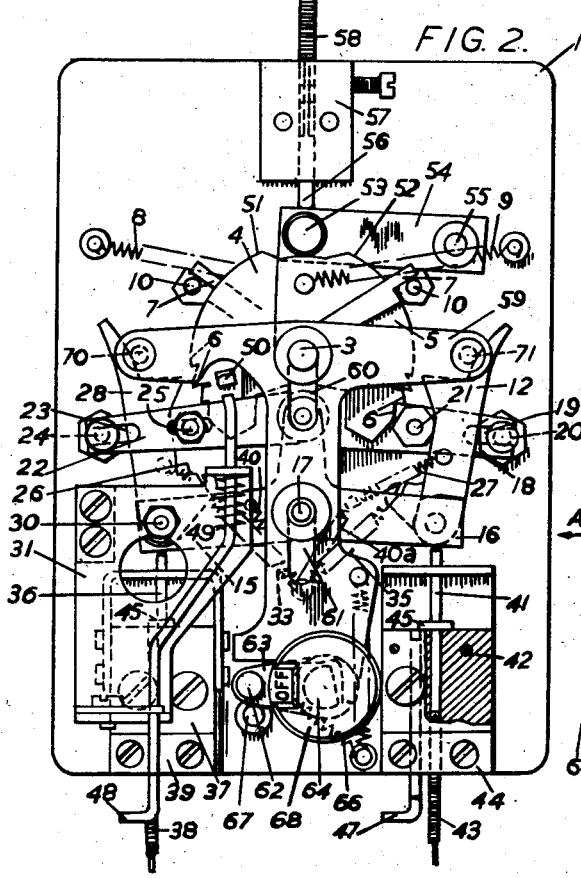
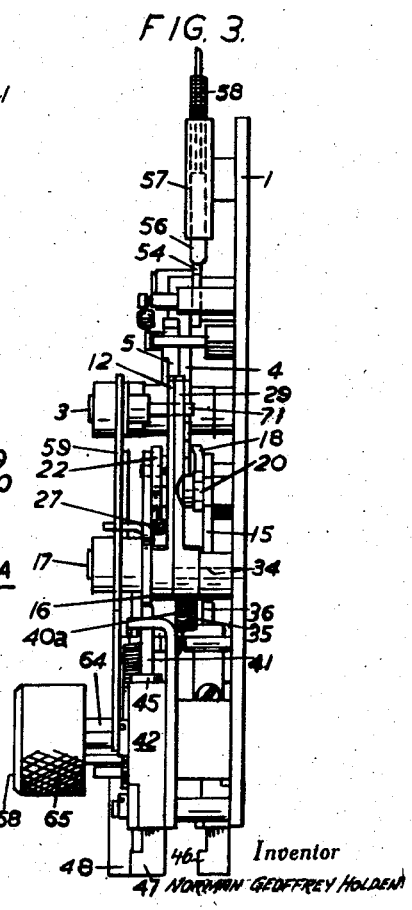
Inventor
NORMAN GEOFFREY HOLDEN
By J. L. Sterling
Attorney July 1, 1952  N. G. HOLDEN  2,601,787

RECORD CONTROLLED STATISTICAL MACHINE

Filed Oct. 4, 1950  2 SHEETS—SHEET 2

Inventor
NORMAN GEOFFREY HOLDEN

By *JL L Sterling*
Attorney

Patented July 1, 1952

2,601,787

UNITED STATES PATENT OFFICE 2,601,787

RECORD CONTROLLED STATISTICAL MACHINE

Norman Geoffrey Holden, Carshalton, England, assignor to Powers-Samas Accounting Machines Limited, London, England, a British company Application October 4, 1950, Serial No. 188,347
In Great Britain October 5, 1949

11 Claims. (Cl. 74—1)

This invention relates to record controlled statistical machines.

In some forms of statistical machines it is sometimes desired to control a selected function of the machine according to a predetermined sequence of other functions of the machine. For example, it is sometimes desired to feed cards from two card magazines alternately into a single card receiver, the magazines having associated therewith a comparing device which determines the order in which the cards are released from sensing positions to the receiver. In such instances, should the cards in the magazine be in proper sequence, cards from the magazines will be delivered alternately to the receiver. If, however, the cards are not in proper sequence there will be at least two cards fed in succession from one magazine. One or more cards in succession out of sequence would cause at least two successive cards to feed from one of the magazines.

As will be understood, the cards issue from the magazines at a high rate and it has heretofore been necessary for the machine operator to watch for the correct alternate delivery of the cards from each magazine and to stop the machine if any error occurs in this procedure.

As already mentioned one card out of sequence causes two cards to feed successively from a magazine, and it has been found difficult, at the high speed of operation of the machine, for an operator visually to detect this over long periods of watching.

It is one object of the invention to provide an automatic control mechanism which will function immediately to stop the machine on the first disagreement detected by the comparing mechanism of the machine.

According to the invention mechanism for controlling a selected function of a statistical machine according to a predetermined sequence of other functions of the machine, comprises movable control members resiliently urged in opposite directions to a starting position an actuator for each control member, to move it away from said starting position each actuator being movable in response to an impulse derived from a function of a statistical machine, the actuators being arranged to move the control members stepwise in opposite directions and thereby impart a setting thereto, trip devices connecting each actuator with the other so that operation of one actuator trips the other and permits the control member associated therewith to be restored to its starting position, an impulse imparting member to control said selected machine function, and an interponent movable by a control member to actuate the impulse imparting member when the actuator associated with the control member receives a predetermined number of successive impulses without the intervention of an impulse to the other of the actuators.

Figure 5:
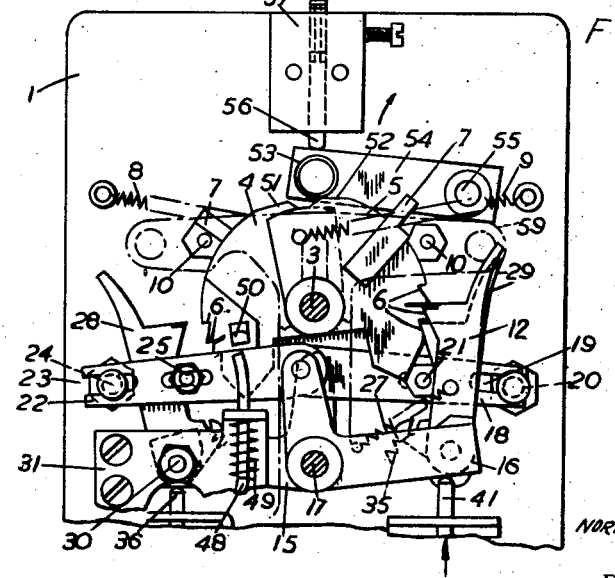

In order that the invention may be more clearly understood one embodiment thereof will be described, by way of example, with reference to the accompanying drawings in which:

Figure 1 is a perspective view of a control mechanism according to the invention enclosed within a cover therefor, Figure 2 is a front elevation of the control mechanism with the cover removed, the actuators being retained in their ineffective position, Figure 3 is an end elevation looking in the direction of arrow A, Figure 2, Figure 4 is a perspective view of the mechanism with the actuators in their effective position but before operation thereof, and Figure 5 is a front elevation, with some of the parts removed, showing the control members and actuators at the instant of operation of one of the actuators.

Referring to the drawings, the mechanism is mounted on a base plate 1, Figures 2 to 5, and is enclosed by a cover 2, Figure 1. A spindle 3 is secured to the plate 1 and freely mounted on the spindle are two control members 4, 5 each having three peripheral teeth 6. To each of the control members 4 and 5 is secured a stop 7 and the control members are respectively urged by springs 8 and 9 in opposite directions to a starting position in which the stops 7 are arrested by pins 10 secured to and extending from the base plate 1.

The control members are respectively provided with actuators 11 and 12 pivoted respectively one to each of an arm of bell-cranks 15 and 16. The bell-cranks are pivoted freely about a spindle 17 common thereto and secured to the base plate 1.

A trip device connects each actuator with the other and the trip device for the actuator 12 comprises a link 18 pivoted to the other arm of the bell-crank 15, the free end of the link being provided with a slot 19 which passes over a guide shown as a pin 20 secured to the plate 1. An abutment shown as a further pin 21 is mounted on the link 18 and extends laterally therefrom and, as will be described below, is arranged to move the actuator 12 and a check pawl associated therewith out of engagement with the control member 5.

The trip device for the actuator 11 also comprises a link as shown at 22, the link 22 being pivoted to the other arm of the bell crank 16 and having at its free end a slot 23 which passes over a guide shown as a pin 24 secured to the base plate 1. The link 22 is also provided with a lateral abutment as shown by the pin 25, this pin serving to move the actuator 11 and a check pawl associated therewith out of engagement with the control member 4. The actuators 11 and 12 are respectively urged towards the control members 4 and 5 by springs 26 and 27, Figure 2, the springs being respectively anchored at one end to the bell cranks 15, 16.

The actuator 11 has associated therewith a check pawl 28, Figure 4, and the actuator 12 has associated therewith a check pawl 29. The check pawl 28 is pivoted at 30 to a bracket 31 mounted on a block 32 secured to the base plate and is urged towards the control member 4 by a spring 33, Figure 2. The check pawl 29 is pivoted on a spindle 34, Figure 3, secured to the base plate 1 and is urged towards the control member by a spring 35.

The actuator member 11 is movable in an upward direction to rotate its associated control member 4 by a plunger 36 mounted for sliding movement in a block 37, Figure 2, the upper end of the plunger engaging the underside of the bell crank 15 so as to rotate the bell crank about the spindle 17. The block 37 also houses one end of a Bowden wire 38 which is clamped in position by a clamping plate 39 secured to the block 37, the plunger being moved upwards by an impulse received from the Bowden wire and returned by a spring 40 acting on the bell crank 15.

The actuator 12 is movable in an upward direction by a plunger 41 slidable in a block 42, the plunger being movable in an upward direction by an impulse received from a Bowden wire 43 which is clamped to the block 42 by a clamping plate 44 the actuator and plunger being returned by a spring 40a, Figure 2, acting on the bell crank 16. The plungers 36 and 41 are each provided with a shoulder 45, the shoulders being adapted for engagement by manually operably members 46 and 47 respectively, these members being mounted to slide in the blocks 37 and 42 and provided so that the actuators associated therewith can be manually operated thereby.

A manually operable setting member 48 is supported by the bracket 31 and is arranged to slide in slots formed in lateral projections extending therefrom, being urged to its lower or starting position by a spring 49. The member 48 when operated is arranged to engage an abutment shown as a projection 50 extending laterally from the face of the control member 4 to impart a stepwise movement to the control member 4 so that a predetermined setting can be applied to the control member prior to its actuation by the actuator 11 as will be described below.

The control member 4 is provided with a peripheral hump 51 and the control member 5 with a peripheral hump 52, these humps being adapted, when the control members have been moved by their actuators against the movement of their springs 8, 9 to a predetermined extent, to engage a roller 53 supported by an interponent 54 comprising an arm pivoted at 55 to the base plate 1. The interponent 54 is retained in engagement with the peripheral surfaces of the control members 4 and 5 by gravity, although, if desired, a light spring may be provided to maintain engagement between the roller and the peripheral surfaces of the control members. On being raised by the peripheral hump 51 or 52 the interponent moves an impulse imparting member shown as a plunger 56 slidably mounted in a block 57 secured to the plate 1. The plunger 56 is arranged to impart an impulse to a Bowden wire 58 to control a selected machine function, for example the impulse may be employed to control mechanism adapted to stop the operation of the machine with which the control mechanism is associated.

When the control mechanism is not operationally employed it is preferably rendered ineffective so that even though impulses may be received through the Bowden wires 38 and 43 the mechanism will not function to impart impulses to the bowden 58. To this end a T-shaped retractor plate 59 is provided with two slots 60 and 61, Figures 2 and 4, fitted over the spindles 3 and 17. The spindles 3 and 17 support the retractor plate and serve to guide it for vertical movement under the control of a pin 62 carried by an arm 63 secured to a sleeve 64 surrounding a fixed spindle, not shown, mounted on the plate 1. At the outer end of the sleeve is secured an angularly movable operating member shown as an operating knob 65. The operating knob together with the arm 63 is rotatable on the spindle against the action of a spring 66 and when the operating knob is turned to the "off" position as shown in Figure 2, in which position the actuators 11 and 12 and their associated check pawls 28 and 29 are withdrawn from engagement with the control members 4 and 5 and are thereby rendered ineffective, the arm 63 is checked by a pin 67 fixed to the base plate 1.

To the outer end of the fixed spindle on which the sleeve 64 is mounted is secured a disc 68 having formed therein an opening 69, and on the outer end of the operating knob 65 are marked the words "On" and "Off." On rotation of the operating knob one or other of these words as appropriate, appears in the opening 69, thus indicating the effective or ineffective condition of the unit.

In order that the operation of the mechanism may be clearly understood this will first be described assuming that the unit is connected to a machine for comparing statistical record cards, the cards being contained in two magazines from which cards, if in sequence, are fed alternately for delivery into receiver pockets. With the machine set to function in this manner it is desired that should two cards be fed in succession from one of the magazines, instead of alternately from each of the magazines, the machine shall be stopped. The bowdens 38 and 43 will in this instance be connected one to each of the two magazine feeds and arranged in a manner such that as each card is fed from a magazine the Bowden wire associated therewith will be actuated to impart an impulse to its associated plunger 36 or 41.

To condition the control mechanism to operate in this manner the operating knob 65 is rotated clockwise from the "off" to the "on" position so that the pin 62 raises the retractor plate 59 to the position shown in Figure 4 in which position pins 70, 71 carried by the retractor plate are moved out of engagement with the actuator members 11 and 12 and their associated check pawls 28, 29 so that these members are rendered effective by being spring urged inwards into engagement with the first tooth of each of the control members 4 and 5, as shown in Figure 4. So that the operator may be certain that the mechanism is properly conditioned the position of the actuators can be inspected through windows 72 and 73, Figure 1, provided in the cover 2 for the mechanism.

When the control mechanism has been conditioned the machine is set in operation and while it is functioning normally and feeding cards alternately from the two magazines the bowdens 38 and 43 will provide alternate impulses to move upwards the plungers 36 and 41. If, while the machine is operating normally, it is assumed that the bowden 43 is actuated, the plunger 41 will raise bell crank 16 thus lifting the actuator 12 and rotating the control member 5 one step in a counterclockwise direction away from the pin 10 and against the action of spring 9. The arm of the bell crank 16 to which the actuator 12 is pivoted is rocked counterclockwise and the other arm of the bell crank 16 moves the link 22 to the left, as viewed in the drawings, causing the pin 25 to engage the actuator 11 and check pawl 28 and causing them to move counterclockwise about their pivots out of engagement with the control member 4. Since, however, during this first stepwise movement of the control member 5 there has been no previous actuation of the control member 4 it is retained by its spring 8 in its starting position with the stop 7 abutting the pin 10. As the Bowden wire 43 is again retracted the return spring 40a for the bell crank 16 pulls the arm thereof to which is pivoted the actuator 12 thereby restoring the link 22 and pin 25 to their starting position and permitting the actuator 11 and check pawl 28 again to enter into engagement with the first tooth of the control member 4.

The next operation of the control mechanism, if the machine continues to work normally, is caused by an impulse from the bowden 38 moving the plunger 36 upwards thus rocking the bell crank 15, thereby lifting the actuator 11 and causing the control member 4 to be moved clockwise one stop away from its starting position 10 against the action of its spring 8. This movement of the bell crank 15 also effects actuation of the link 18 so that the pin 21 carried thereby trips the actuator 12 and check pawl 29 out of engagement with the control member 5 which is thus moved clockwise by its spring 9 and returned to starting position. The actuator 12 and check pawl 29 are again restored, due to the action of their return springs on retraction of the Bowden wire 38.

The alternate operation of the bell cranks 15, 16 and the actuators 11 and 12 carried thereby, as just described, is continued all the time the machine continues to function normally so that each time an impulse is applied to the mechanism by one of the bowdens the trip device comprising the link 18 and pin 21 or the link 22 and pin 25 is operated to cancel out the previous setting of a control member effected by an impulse applied by the other of the bowdens. If, however, the card feeding mechanism at one side of the machine should operate twice in succession without the intervention of a feeding operation from the other of the magazines, the actuator associated with the magazine which is operated twice in succession will also be operated twice in succession to move its associated control member. In Figure 5 the actuator 12 has already been operated to move the control member 5 one step in a counterclockwise direction and is shown in the position in which it has just reached the top of its stroke to move the control member 5 a second tooth distance in the counterclockwise direction. At the top of the stroke of the actuator 12, as shown, the actuator 11 and check pawl 28 are fully out of engagement with the control member 4. Also, when the control member 5 has been moved to the position shown in Figure 5, the roller 53 has been engaged by the hump 52 on the periphery of the control member 5 thereby lifting the interponent 54 and effecting actuation of the plunger 56 thus imparting an impulse to the bowden 58 to control suitable mechanism, not shown, which functions to stop the operation of the machine, thus indicating that the cards are not being fed correctly from the magazines.

When the control mechanism is conditioned to operate in the manner just described the mechanism will, on restarting the machine after a stoppage, continue to function in the manner described above as normally the next impulse should be from the magazine associated with the control member other than that which was operated to produce the impulse which resulted in the stopping of the machine. The operation of said other control member will cancel out the setting previously applied to the control member which caused the stopping of the machine. If, however, it should so happen that the first card fed on restarting the machine should be from the same magazine as fed the two previous successive cards then the actuator associated therewith will be engaged beneath the third tooth on the already set control member and the machine will again be stopped. If, however, the impulses are now again succeeding each other alternately in the normal manner the operator will note this visually for the first two or three cycles of the machine whilst holding the starting handle.

Another purpose for which the control mechanism may be employed is in connection with a machine for comparing data on pairs of cards. In this instance the data compared on the two cards should be identical and the cards of a pair are fed simultaneously one from each of two magazines.

If the comparing mechanism associated with the machine determines that the data on the pair of cards being compared is identical then the two cards are delivered into receivers therefor. If, however, in forming the packs which are placed in the magazines one pack has a card missing or has introduced into the pack a card which should not be there, then at some stage when two cards are compared the comparing mechanism will find a disagreement between the cards and the disagreeing card will be delivered to a disagreement receiver. In such circumstances, however, no pairs of cards fed after the disagreement will agree and it is desired to stop the machine when the first disagreeing card is detected by the comparing mechanism.

When the control mechanism according to the invention is to be employed for stopping the machine on a disagreement as just described, the operating knob 65 is turned from the "off" to the "on" position to condition the mechanism for operation and the manually operable member 47 is then pressed upwards to impart a preliminary setting to the control member 5. The manually operable setting member 48 is then also pressed upwards against the action of its spring 49 so that it engaged the abutment 50 and imparts a preliminary setting to the control member 4. This preliminary setting is applied to the control member 4 by the setting member 48 to avoid operation of the actuator 11 which, through the trip device 18, 21, would cancel the setting applied to the control member 5 by the member 47.

When the control members have been so preset each has been moved against the action of its return spring one tooth step and for this mode of operation this represents the starting position for the control members and not the pins 10 as described above. In order that the operator may ensure that the preliminary setting has been correctly applied to the control members inspection thereof may be made through the openings 72 and 73 in the cover 2 and the control members 4 and 5 are each provided with a red line adjacent the second teeth on the members, a similar line being marked respectively on the actuator 12 and the check pawl 28. Thus, when the preliminary setting has been made these red lines should be substantially in alignment as indicated in Figure 1.

When the mechanism is to operate in the manner now being described the bowdens 38 and 43 are actuated by the comparing mechanism associated with the machine and accordingly when the machine is set in operation an impulse received from either of the bowdens 38 or 43 will move the respective control member a further tooth stage against the action of its spring and will effect actuation of the interponent 54 thereby causing the machine to be stopped. Thus, it will be seen that in this instance the first operation of either of the actuators 11 or 12 will cause the machine to be stopped and an actuator will be operated only when the comparing mechanism of the machine determines a state of disagreement between two cards being compared.

When the control mechanism is being used for the purpose last described it is necessary each time the machine is stopped, as a result of the operation of the control mechanism, to reset the mechanism to the pre-set starting position described above. This is done by turning the operating knob 65 to the "off" position and then again turning it to the "on" position and manually resetting the control members as above described so that the red lines again are aligned as indicated in Figure 1.

It should be understood that although in the foregoing description the impulses to the plungers 36 and 41 have been described as being imparted thereto by Bowden wires the impulses could, if desired, be imparted electrically, for example by means of solenoids. Similarly the movement of the interponent 54 may be adapted to make or break an electrical switch controlling the starting and stopping of the machine to which the control mechanism is connected.

It will also be understood that while two uses for the control mechanism have been described above the mehcanism may be employed for many other purposes where it is desired to control a selected function of a machine as a result of other functions of the machine.

I claim:

1. Mechanism for controlling a selected function of a statistical machine according to a predetermined sequence of other functions of the machine, comprising movable control members resiliently urged in opposite directions to a starting position, an actuator for each control member to move it away from said starting position, each actuator being movable in response to an impulse derived from a function of a statistical machine, the actuators being arranged to move the control members stepwise in opposite directions and thereby impart a setting thereto, trip devices connecting each actuator with the other so that operation of one actuator trips the other and permits the control member associated therewith to be restored to its starting position, an impulse imparting member to control said selected machine function and movable by a control member to actuate the impulse imparting member when the actuator associated with the control member receives a predetermined number of successive impulses without the intervention of an impulse to the other of the actuators.

2. Mechanism according to claim 1 wherein the control members are mounted for angular movement and each is provided with peripheral teeth for engagement by its associated actuator.

3. Mechanism according to claim 1, including an interponent for engagement with said impulse imparting member comprising a pivoted arm normally engaging the peripheries of the control members and each control member being provided with a peripheral hump to move the interponent about its pivot after a predetermined number of stepwise movements of the control member to effect actuation of said impulse imparting member.

4. Mechanism according to claim 1, including bell-cranks, each actuator being pivoted to one arm of a bell crank and resiliently urged towards its associated control member, the bell-cranks for the actuators being supported on a pivot common thereto and each being resiliently urged towards a plunger associated therewith to transmit impulses thereto, the other arm of each bell crank having attached thereto the trip device effecting connection with the actuator supported by the other of said bell-cranks.

5. Mechanism according to claim 4, wherein each trip device comprises a link one end of which is pivotally attached to one of said bell cranks and the other end mounted for movement relative to a guide therefor, an abutment extending laterally from said link being arranged, on operation of the actuator pivoted to the other arm of the bell crank, to engage the other of the actuators and the check pawl associated therewith and to move said other actuator and check pawl out of engagement with the control member associated therewith.

6. Mechanism according to claim 4 wherein means is provided simultaneously to render each of the actuators ineffective, said means comprising a retractor plate supported by a spindle common to the control members and by the pivot common to said bell cranks and adapted for movement relative thereto, abutments extending laterally from the retractor plate to engage the actuators and move them out of engagement with the control members and an angularly movable operating member to effect movement of the retractor plate selectively to render the actuators effective or ineffective.

7. Mechanism according to claim 1, wherein a manually operable member is associated with each actuator to effect manual operation of the actuator.

8. Mechanism according to claim 1, wherein an abutment extends laterally from a control member and a manually operable setting member is provided to engage said abutment and impart a stepwise movement to the control member whereby a predetermined setting may be applied to the control member prior to its actuation by its associated actuator.

9. Mechanism according to claim 1, wherein the mechanism is enclosed by a cover having an inspection opening or openings through which the position of the actuators relative to the control members may be observed.

10. A mechanism according to claim 1 including bell-crank means having arms extending in opposite directions and arms extending in the same direction, the actuators being pivoted in the ends of the oppositely extending arms and the trip devices being pivoted in the ends of the arms extending in the same direction and means for moving said bell-cranks to enable one actuator and disable another.

11. A mechanism according to claim 10 including a check pawl coacting with each actuator the pawl being spring urged toward its associated control member and engageable by the trip, device controlling the actuator coacting therewith.

NORMAN GEOFFREY HOLDEN.

REFERENCES CITED

The following references are of record in the file of this patent:

UNITED STATES PATENTS

| Number | Name | Date |
|---|---|---|
| 1,165,092 | Grunow | Dec. 21, 1915 |